(12) United States Patent
Orr (10) Patent No.: US 6,831,652 B1
(45) Date of Patent: Dec. 14, 2004

(54) METHOD AND SYSTEM FOR STORING GRAPHICS DATA

(75) Inventor: Stephen J. Orr, Markham (CA)

(73) Assignee: ATI International, SRL, Barbados (KN)

( * ) Notice: Subject to any disclaimer, the term of this patent is extended or adjusted under 35 U.S.C. 154(b) by 0 days.

(21) Appl. No.: 09/534,656

(22) Filed: Mar. 24, 2000

(51) Int. Cl.$^7$ ............................................. G06F 12/02
(52) U.S. Cl. ...................... 345/543; 345/503; 345/536; 345/531; 345/545
(58) Field of Search ................. 345/419, 473, 345/474, 503, 531, 536, 543, 544, 545, 564

(56) References Cited

U.S. PATENT DOCUMENTS

| | | | |
|---|---|---|---|
| 5,533,181 A | * | 7/1996 | Bergsneider ................. 345/473 |
| 5,727,203 A | * | 3/1998 | Hapner et al. ........... 707/103 R |
| 5,841,439 A | * | 11/1998 | Pose et al. ................... 345/418 |
| 5,930,827 A | * | 7/1999 | Sturges ........................ 711/170 |
| 5,986,667 A | * | 11/1999 | Jevans ......................... 345/619 |
| 5,987,242 A | * | 11/1999 | Bentley et al. ................ 703/13 |
| 6,009,266 A | * | 12/1999 | Brownell et al. ............ 709/315 |
| 6,215,495 B1 | * | 4/2001 | Grantham et al. ........... 345/419 |
| 6,275,234 B1 | * | 8/2001 | Iwaki ........................... 345/428 |
| 6,275,828 B1 | * | 8/2001 | Lee et al. ..................... 717/116 |
| 6,353,860 B1 | * | 3/2002 | Hare et al. ................... 719/316 |
| 6,369,821 B2 | * | 4/2002 | Merrill et al. ............... 345/473 |
| 6,377,263 B1 | * | 4/2002 | Falacara et al. ............. 345/473 |
| 6,380,935 B1 | * | 4/2002 | Heeschen et al. ........... 345/423 |
| 6,466,210 B1 | * | 10/2002 | Carlsen et al. .............. 345/435 |
| 2002/0056120 A1 | * | 5/2002 | McTernan et al. ............. 725/87 |

OTHER PUBLICATIONS

Ronald Pose, "Capability Based, Tightly Coupled Multiprocessor Hardware to Support a Persistent Global Virtual Memory", Proceedings of the Twenty–Second Annual Hawaii International Conference on System Sciences, vol. 2, 1989, p. 36–45.*

* cited by examiner

*Primary Examiner*—Ulka J. Chauhan
(74) *Attorney, Agent, or Firm*—Vedder, Price, Kaufman & Kammholz (57) ABSTRACT

In accordance with a specific implementation of the present invention, the control portion of a graphics processor receives a command having both a data portion and a data duration portion. When the data duration portion indicates the data is transient data for short-term use, the control portion stores the data associated with the data portion at the first memory partition. When the data duration portion indicates the data is persistent data for long-term use, the control portion stores the data associated with the data portion at a second memory partition. In a multiple processor system, transient data may be stored only in a memory partition associated with a first processor, while persistent data may be stored in multiple memory partitions, one for each graphics processor.

37 Claims, 7 Drawing Sheets

| STORE CMD1 (GRAPHICS DATA, DURATION INDICATOR) |
|---|
| STORE CMD2 (GRAPHICS DATA, DURATION INDICATOR, SET INDICATOR) |
| STORE CMD3 (GRAPHICS DATA, DURATION INDICATOR, DATA TYPE INDICATOR) |
| STORE CMD4 (GRAPHICS DATA, DURATION INDICATOR, DATA TYPE INDICATOR, SET INDICATOR) |
| FLUSH CMD1 (DURATION INDICATOR) |
| FLUSH CMD2 (SET INDICATOR) |

METHOD AND SYSTEM FOR STORING GRAPHICS DATA

FIELD OF THE INVENTION

The present invention relates generally to storing graphics data, and specifically to storing graphics data in video memory for subsequent display.

BACKGROUND OF THE INVENTION

The use of graphics processors to receive and render graphics data is well known in the computer industry. The use of multiple graphics processors, each of which are responsible for rendering a portion of a frame, have also been proposed to provide increased graphics processing performance. However, data bandwidth capabilities often limit performance of both single and multiple processor systems.

Application programs are responsible for providing the data required for each frame rendered. Generally speaking, when rendering 3D images, each frame contains object data and texture data. Object data defines the shapes of the images displayed, while texture data is used to fill the objects with specific fill data. Large amounts of data are required to render an individual frame, depending upon the complexity of the image being rendered. The application program, which is executed by the system processor, is responsible for providing this data. A noticeable glitch, such as a pause, occurs when the amount of image data required for a data frame is greater than the amount of data that can be sent in an undetectable amount of time by the application program over the system bus.

The use of memory caches in graphics processors is one way of reducing the amount of data transferred. With a data cache, the most recently used graphics data is stored in a memory cache for quick future accessibility based on the assumption that recently used data is likely to be used again in the near future. The effectiveness of a memory cache depends upon the size of the cache and the characteristics of the graphics image.

Therefore, a system and/or method that is capable of improving the quality of viewed video data and bandwidth utilization would be beneficial.

DETAILED DESCRIPTION OF THE DRAWINGS

In accordance with a specific implementation of the present invention, a command having both a data portion and a data duration portion is received at a control portion of a graphics processor. The control portion stores the data associated with the data portion at a first memory partition when the data duration portion indicates the data is transient data for short-term use. The control portion stores the data associated with the data potion at a second memory partition when the data duration portion indicates the data is persistent data for long-term use. In a multiple processor system, transient data will be stored in a memory partition associated with a first processor, while persistent data will be stored in memory partitions for each graphics processor. The present invention is better understood with reference to the FIGS. 1–9.

Figure 1:
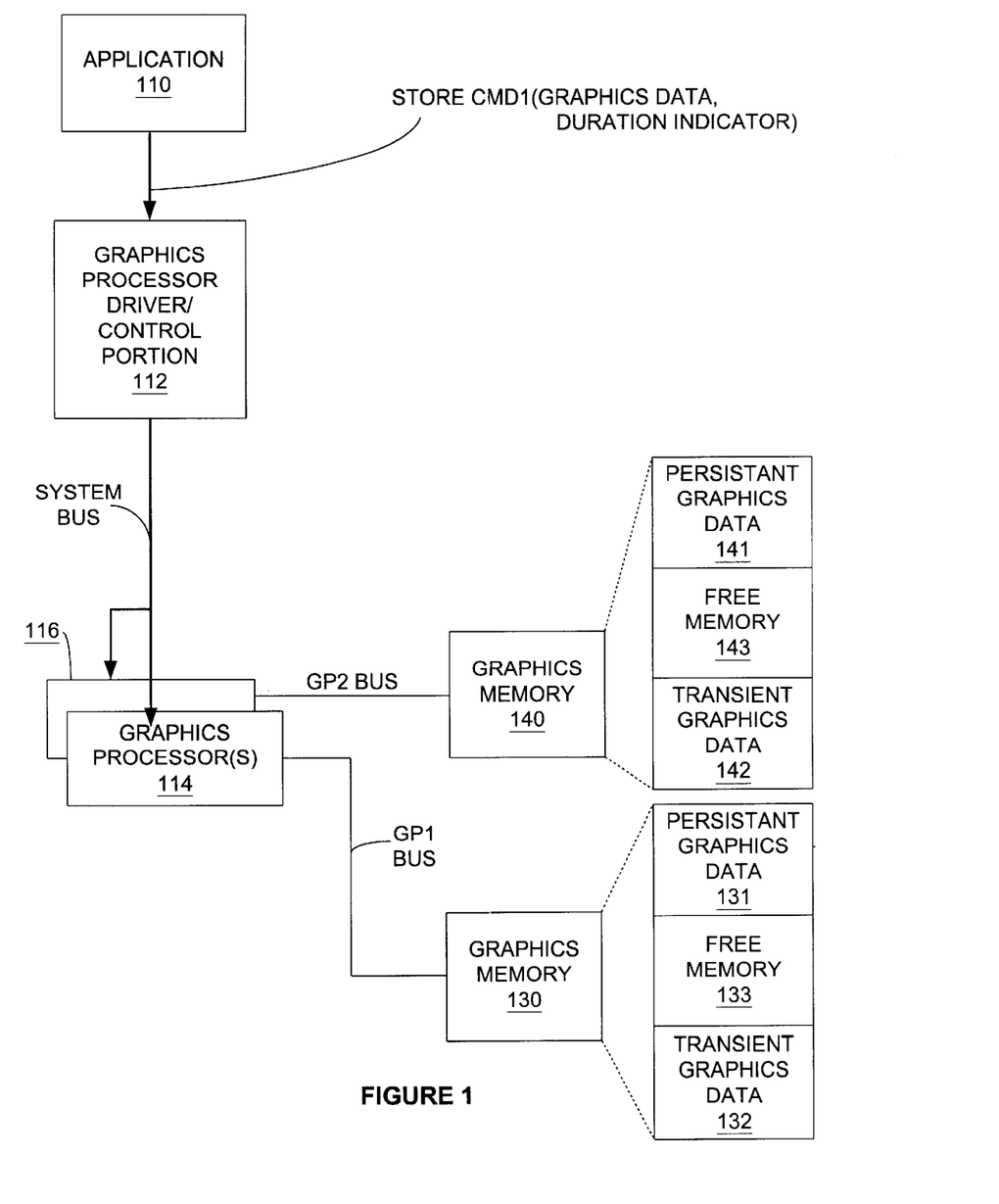
FIG. 1 illustrates, in block diagram form, a system in accordance with the present invention.

FIG. 1 illustrates a block diagram of a system in accordance with the present invention. Specifically, FIG. 1 illustrates an application portion 110, which represents an application responsible for providing graphics data to be rendered by one or more graphics processors. In a typical system, the application portion 110 is a software application that is executed by a processor system, such as a general purpose computer. However, the application may also use or operate on dedicated hardware.

The application portion 110 is connected to a graphics processor driver/control portion 112. As illustrated, the connection between the portion 110 and portion 112 provides instructions or commands from the application portion 110 to the control portion 112. The connection between portion 110 and portion 112 can be a dedicated physical connection, such as data bus, and/or can represent data passed between portions of software. Examples of passed data include data passed a part of a function call, subroutine call, or accessed through the use of pointers.

In one embodiment, the control portion 112 includes graphics processor software drivers. Such software drivers are usually graphics processor specific routines that are executed by the same data processor that executes the application. However, in other embodiments, the control portion 112 can be hardware for receiving and/or accessing the commands from the application portion 110. In addition, the control portion may be implemented as part of the graphics processor, or other hardware, which may be stand-alone hardware.

For a system where the control portion 112 is executed on a host system, the control portion 112 is connected to a system bus that provides access to one or more graphics processors. Multiple graphics processors 114 and 116 are specifically illustrated in FIG. 1. In one implementation, the system bus is a PCI (Peripheral Component Interconnect) bus, which is capable of being coupled to multiple graphics processors. In another embodiment, the system bus is an AGP (Advanced Graphics Protocol) bus. Generally, an AGP bus is capable of being connected to only a single graphics processor. Therefore, the system bus can represent both an AGP bus and a PCI bus, allowing one graphics processor to be connected to each of the two busses. In yet another embodiment, a single AGP bus can be connected to a bridge device (not illustrated) that provides AGP access to multiple devices.

FIG. 1 illustrates graphics processors 114 and 116 connected to the system bus. The graphics processors 114 and 116 provide host bus interface support between the system bus and any associated local busses. In one embodiment, the graphics processors 114 and 116 are separate graphics processors, each having their own host bus interface controller. In another embodiment, the graphics processors may be separate, or integrated processors that share a common host bus interface. In addition, the graphics processors 114 and 116 control access to their respective video memory busses labeled GP1 BUS and GP2 BUS.

Graphics processors 114 and 116 are illustrated to have physically separate video memories. Specifically, graphics processor 114 connects to video memory 130 through bus GP1, while graphics processor 116 connects to video memory 140 through bus GP2.

Figure 2:
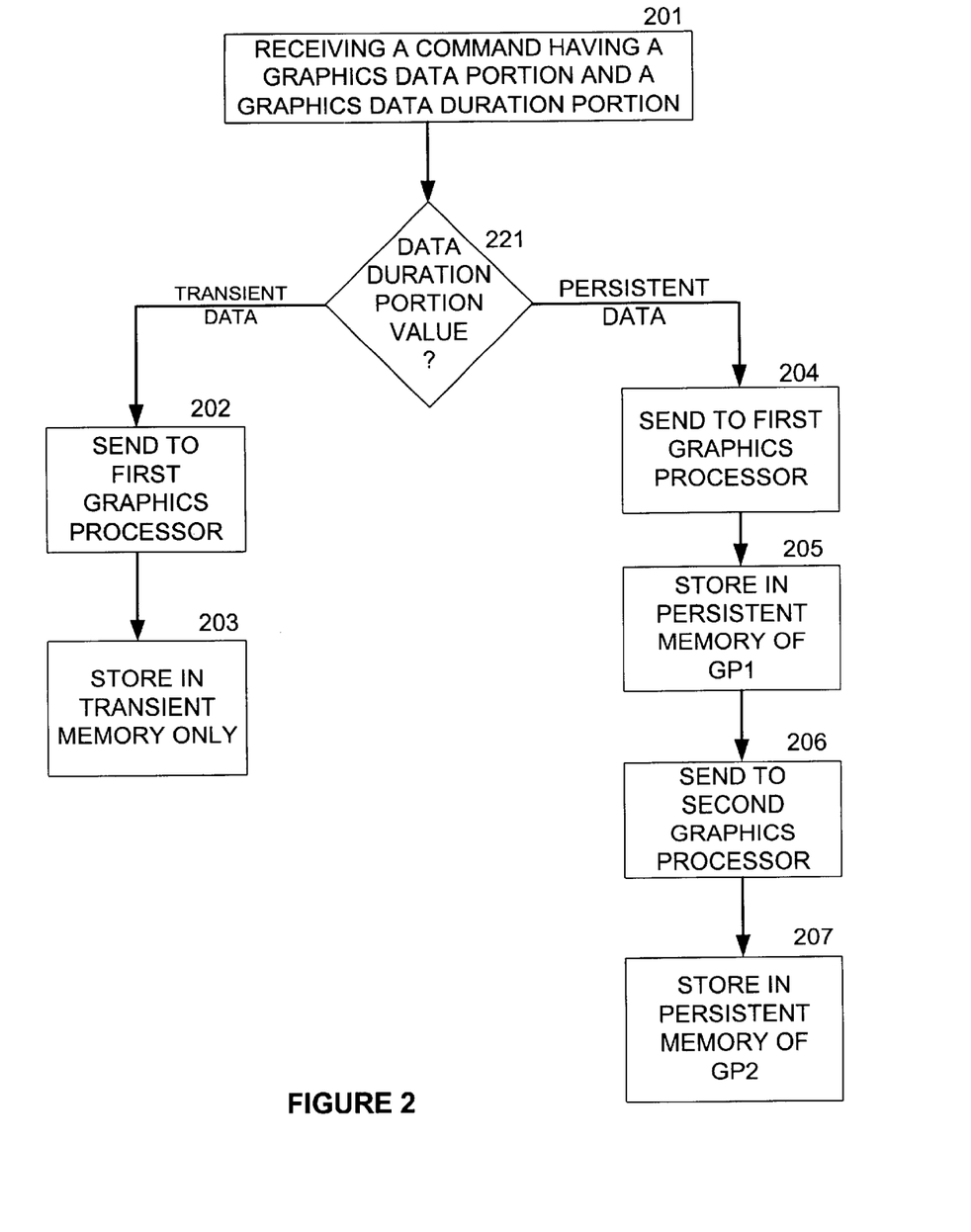
FIG. 2 illustrates, in flow diagram form, a method in accordance with the memory partition illustrated in FIG. 1.

A specific mode of operating the system of FIG. 1 is described by the method of FIG. 2. At step 201, a command provided by the application 110 is received at the control portion 112. The command identifies data to be stored for render, and a data duration indicator. The data can be identified by providing the data directly, providing a pointer to the data, or any other method of identifying specific data. The data may be provided in a bit mapped form, or in a standard or custom video protocol.

The data duration indicator provides an indication how the data associated with the command will be used. For example, a data duration indicator can indicate the data is either a short-term (transient) data or long term (persistent) data. In one implementation, short term data is data that is to be used or displayed for a single frame, while long term data is data that is expected to be used or displayed in more than a single frame. In other implementations, the duration indicator can specify a number of frames during which the data is expected to be needed, a chronological amount of time during which the data is expected to be needed, or any other appropriate indicator of data duration.

At step 221, the value of the data duration indicator determines the method's flow. When the data duration value indicates that short-term data is being identified, the flow proceeds to step 202. When the data duration value indicates that long term data is being identified the flow proceeds to step 204. It will be appreciated by one of ordinary skill in the art that the definition of short and long term data can vary depending upon the actual data type associated with the data duration indicator. For example, where the data duration indicator specifies a chronological amount of time, a definition defining short term and long-term data in terms of chronological time will be needed.

At step 202, the control portion 112 provides the data to the graphics processors. In a specific implementation, the control portion causes the data and address information to be written onto the system bus. If the control portion is integrated onto the graphics processor or a related graphics board, step 112 would be responsible for providing the data by enabling appropriate portions of the processor or board.

At step 203, the data identified in step 201 is stored into a transient lo memory portion of video memory. For a single graphics processor system (i.e. assuming only graphics processor 114) the data will be stored at a portion of the graphics memory identified to store transient graphics data, for example, transient graphics location 132 of FIG. 1. In one embodiment, the transient graphics location 132 is used to store data associated with the next frame of graphics to be rendered. Therefore, when the data is only needed for the next frame, it is only stored at the memory used for that purpose.

For a multi-graphics processor system, the steps 202 and 203 will provide the data only to the processor responsible for processing the next frame of data. The control portion 112 will generally handle the overhead associated with determining which processor is to render a specific frame.

When the data duration indicator indicates persistent data, the flow proceeds to step 204. At step 204, the control portion 112 provides the data to a first graphics processor. In a specific implementation, the control portion causes the data and address information to be written onto the system bus. If the control portion is integrated onto a graphics processor or a related graphics board, control portion 112 would be responsible for providing the data by enabling appropriate portions of the processor or board to facilitate reception and storage of data.

At step 205, the data identified in step 201 is stored into a persistent memory portion of video memory. For a single graphics processor system (i.e. assuming only graphics processor 114) the data would be stored at the portion of the graphics memory identified to store persistent graphics data, (for example, persistent graphics location 131 of FIG. 1.) In one embodiment, graphics data to be used beyond the next frame is stored in the persistent graphics location 131. Therefore, data that is used repeatedly is stored into the frame buffer at a location where the data is to be maintained, until instructed otherwise. One example of a common type of persistent data is texture data. Texture data is used to provide fill to objects, where a sequence of objects gives the perception of a movement. While a sequence of frames may repeatedly change to give the appearance of motion to the object displayed, the texture data associated with the series of objects will generally stay the same.

In addition to storing the data in the persistent graphics location 131, the data may also be stored in the transient data location 132 as well. For example, where the data is to be used in the next frame, as well as subsequent frames, the data will be stored in the transient frame in order to render the next frame of video. In one embodiment, the transient data can be provided by a second write to the video memory 130. However, a copy command, sent to the graphics processor 114 by the application 110 or control portion 112, is a preferred embodiment. In that embodiment, a copy command eliminates the need for transferring data over the system bus once the data is in the memory 130. This results in the use of less bandwidth of the system bus. It will be readily recognized that in an alternate embodiment, the data can first be stored to the transient data location and then copied to the persistent data location.

Maintaining persistent data in a stored memory location reduces the amount of data need to be transmitted across the system bus. Subsequent access to the data stored in the persistent memory area only requires a copy command, thereby reducing, and or eliminating, the need to send data repeatedly across the system bus. Using a persistent memory area allows the application program to deterministically identify data that should be maintained. In systems where only a data cache is used, the graphic processor's use of the cache is not based upon deterministic criteria. Furthermore, providing specific commands that are interpreted and handled by the control portion 112 leaves the application 110 to processes the next data to be rendered.

Steps 206 and 207 are analogous to steps 204 and 205 for a second graphics processor. For example, in a system where different graphics processors are used to render alternating frames of video, the persistent data needs to be available to both processors. Therefore, the persistent data is stored in the persistent memory location 131 of the graphics processor 114, and at the persistent memory location 141 of the graphics processor 116. In one embodiment, this will require two separate write commands over the system bus. In another embodiment, a single write over the system bus occurs to one of the multiple processors. Upon receiving the data, the receiving processor stores the received data in its own memory and the memory of a second graphics processor, either directly or indirectly. Indirectly storing the data in the second processor's memory can be accomplished by use of a bus, other than the system bus, or by providing the data to a common memory location that is accessible by the second processor. Directly providing the data to the second processor's persistent memory includes the memory controller of the receiving processor storing the data directly to the second processor's memory location. In a specific embodiment, a data bridge (not illustrated) can be used to properly route data among the graphics processors.

Figure 7:
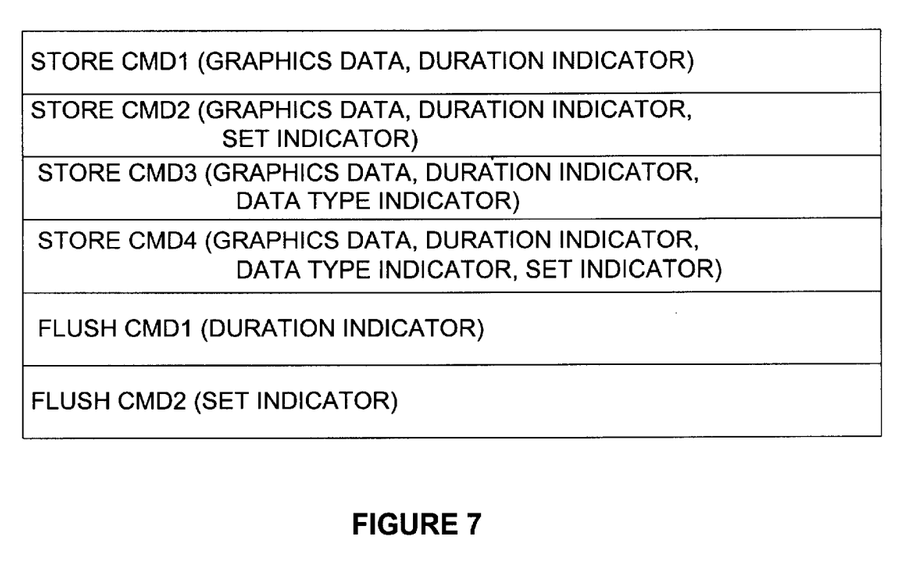
FIG. 7 illustrates, in tabular form, a plurality of commands in accordance with the present invention.

In the specific partitioning of video memories 130 and 140 illustrated in FIG. 7, the persistent video and the transient video data are stored at opposite ends of the respective video memory. By leaving free, or unallocated, memory space between the persistent and transient memory locations of each of the memories, additional memory of either type can be easily allocated to create a larger contiguous memory location. Reallocation of the entire transient or persistent memory location is efficiently accomplished when the respective data types are stored in contiguous memory.

Figure 3:
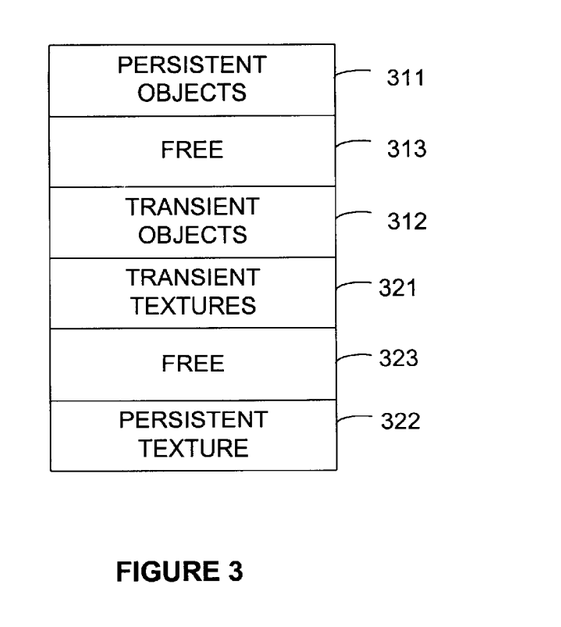
FIG. 3 illustrates, in block form, an alternate memory partition in accordance with the present invention.
Figure 4:
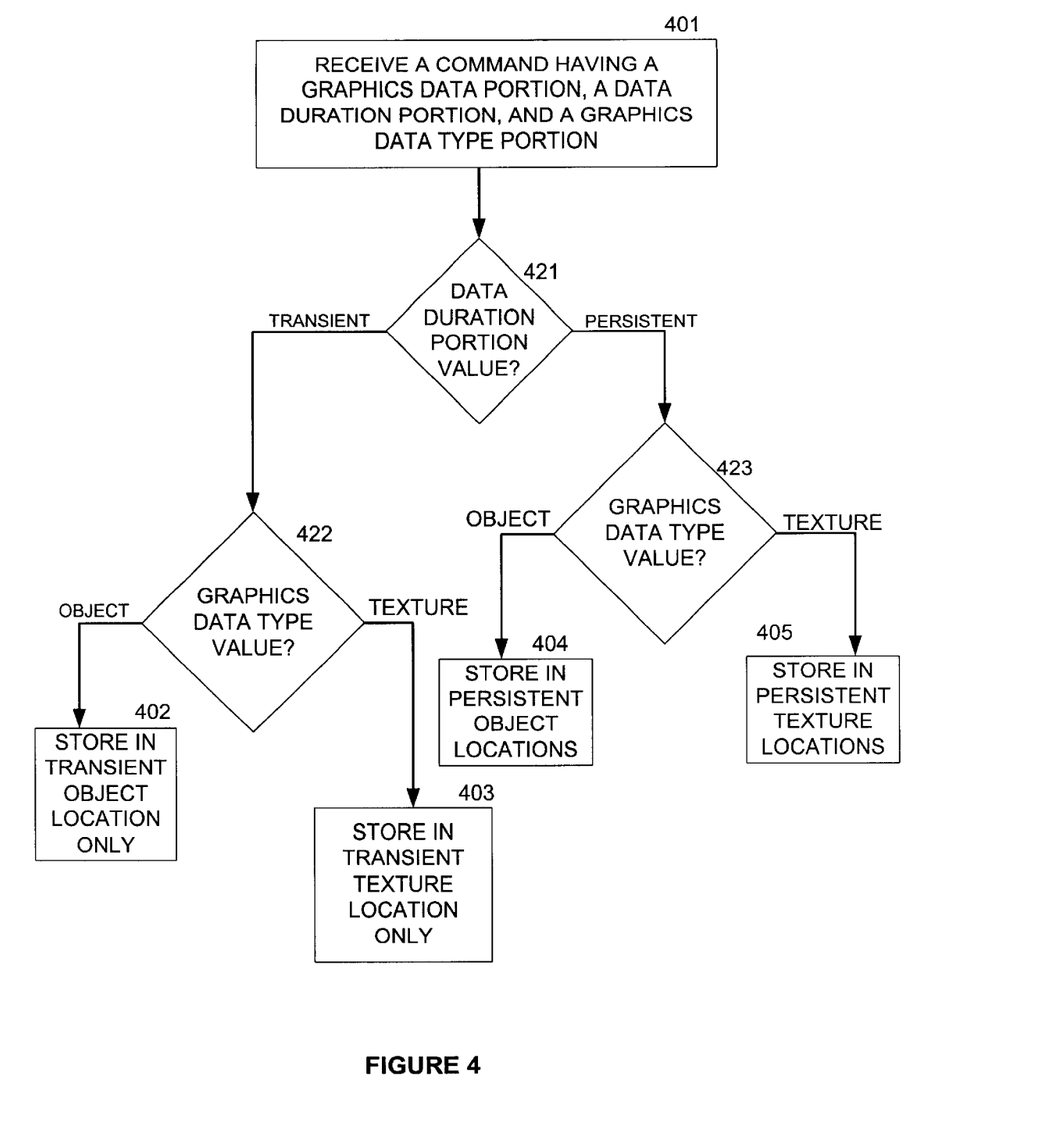
FIG. 4 illustrates, in flow diagram form, a method in accordance with the memory partition illustrated in FIG. 3.

FIGS. 3 and 4 respectively illustrate an alternate memory allocation scheme and method for accessing the alternate allocation. At step 401, a command provided by the application 110 is received at the control portion 112. The command identifies data to be stored, a data duration indicator, and a data type indicator. The data and data duration indicators have been described with reference to the method of FIG. 2.

The data type indicator provides an indication of the type of data being provided. For example, a data type indicator can be provided that indicates the data is either object data or texture data.

At step 421, a determination similar to that of previously described step 221 is performed. As a result, flow will proceed to step 422 when transient data is detected, or to step 423 when persistent data is detected.

At step 422, the value of the data type indicator determines the flow. When the data type indicator value indicates that the data is object data, the flow proceeds to step 402. When the data type indicator value indicates that the data is texture data, the flow proceeds to step 403. It will be appreciated by one of ordinary skill in the art that different and/or additional data type classifications can be used.

At step 402, the identified data is stored in the memory location 312, which has been identified for transient object data. Likewise, at step 403, the transient texture data is stored in the memory location 321, which has been identified for transient texture data.

At step 423, the value of the data type indicator determines the flow. When the data type indicator value indicates that the data is object data, the flow proceeds to step 404. When the data type indicator value indicates that the data is texture data, the flow proceeds to step 405.

At step 404, the persistent object data is stored at memory location 311, which has been identified for persistent object data. In addition, where multiple processors are used, step 404 will also store the persistent data in each of the multiple processors' persistent memory locations. Likewise, at step 403, the persistent texture data is stored at memory location 322, which has been identified for persistent object data, and in persistent memory locations associated with other graphics processors.

The data partition illustrated in FIG. 3 allows for greater resolution and control over the allocation and deallocation of memory. For example, in applications where object data is maintained for a fewer number of frames than texture data, the ability to separate object data from texture data in a separate partition allows for improved data management.

Figure 5:
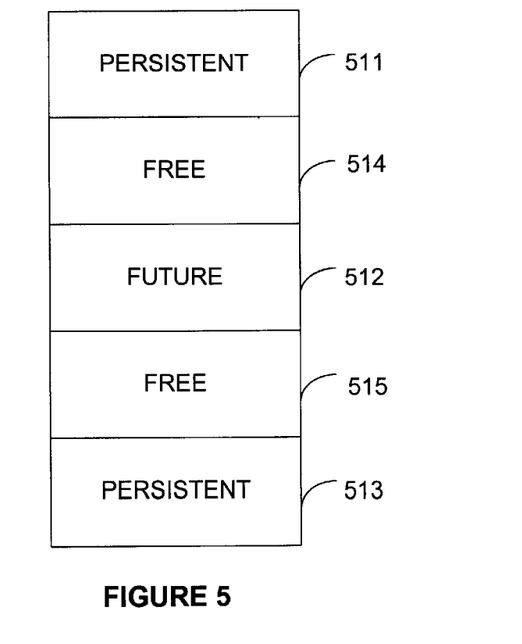
FIG. 5 illustrates, in block form, an alternate memory partition in accordance with the present invention.
Figure 6:
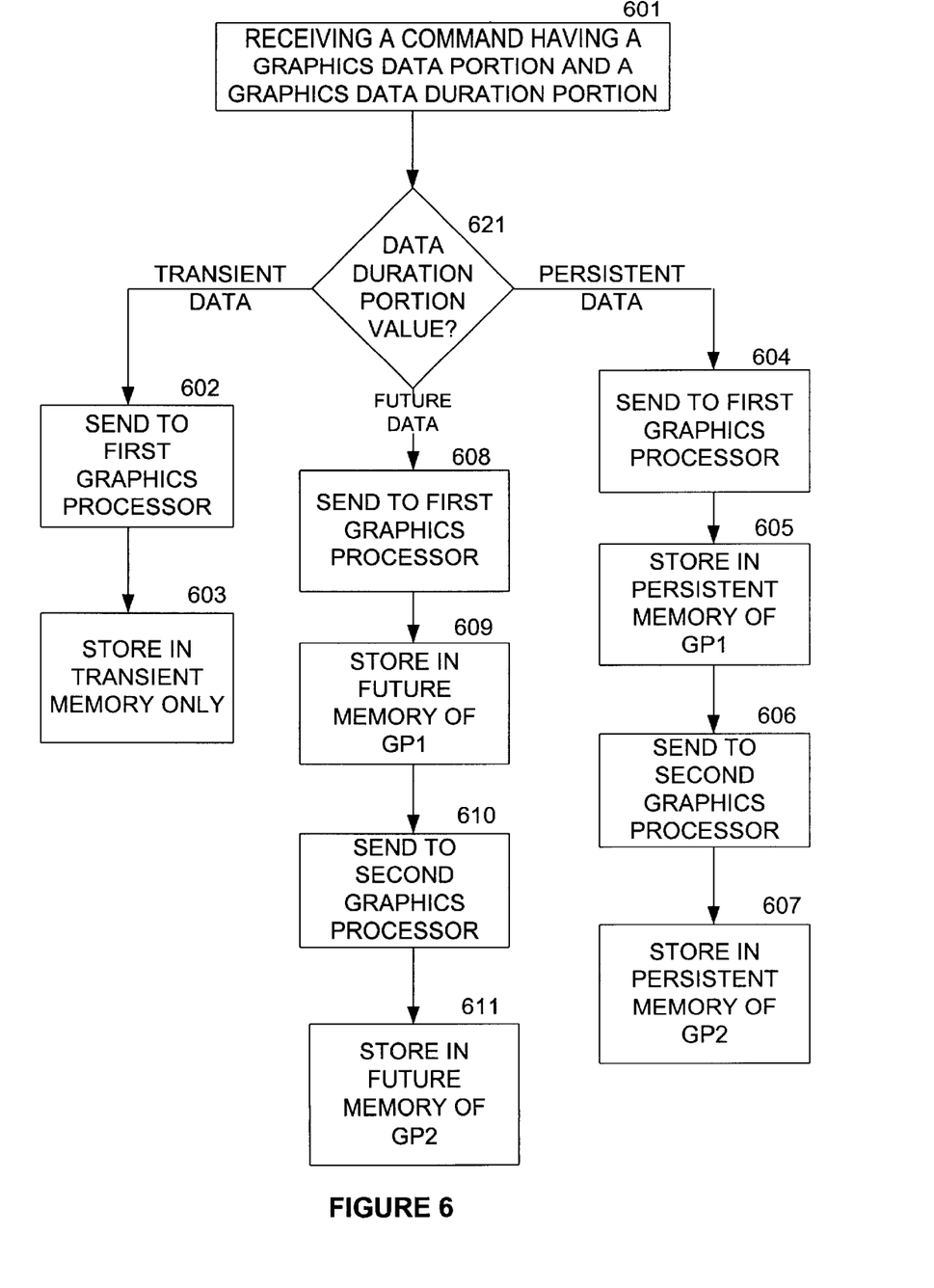
FIG. 6 illustrates, in flow diagram form, a method in accordance with the memory partition illustrated in FIG. 5.

FIGS. 5 and 6 illustrate an alternate memory partitioning scheme and lo method for using the alternate-partitioning scheme. The alternate video memory partition of FIG. 5 includes transient data, persistent data and a third data duration indicator value for future data. The steps of the method of FIG. 4 relating to the transient and persistent data are substantially the same as the steps of FIG. 2. However, at step 621 based upon when the data type indicator value indicates future data, data flow proceeds to step 608. Identified future data is stored for future use. For example, in a game application, if it is expected that a player will enter a new room (based on a player's current actions including direction of travel,) it is possible for the application to send data identified as future data to the graphics processor for storage in the video memory. Once the player actually enters the future room, the application can issue copy and/or move commands to access the preloaded room data. By preloading graphics data directly to the frame buffers, it is possible to avoid discontinuities in the graphics display, caused by the loading of large amounts at the time the data is needed. At steps 608 and 609, the transient object data is sent and stored at a memory location, or partition, 512, which has been identified for storing future data. At steps 610 and 611, the data is sent and stored at other future partitions of memories associated with multiple processors.

In a specific implementation, all persistent future data can be loaded in a contiguous area and subsequently used or moved. For example, the data is stored in the future data location can be moved or copied to the persistent and/or transient memory area using a block move or copy after the predicted room is actually entered. Likewise, data with common duration or types can be loaded in respectively contiguous regions of the future memory location.

FIG. 7 illustrates a table listing various commands in accordance with the present invention. Each command of FIG. 7 can be provided by the 10 to 112 for storage of data. A first storage command labeled STORE CMD1 has been discussed with reference to the method of FIG. 2.

A second storage command labeled STORE CMD2 is similar to STORE CMD1, except that an additional field is associated with the command. The additional field is a set indicator. In operation, the set indicator of a command will identify data with a specific set of data. By providing a set identifier, memory management operations by the application can be simplified. For example, a figure or scene associated with a game may comprise dozens of individual objects and/or textures. If the application identifies these objects and/or textures as part of a common set, the entire figure or scene may be deallocated, or otherwise marked as unused, from memory with a single command. An example of such a command is a flush command as discussed below.

A third storage command labeled STORE CMD3 has been discussed with reference to the method of FIG. 4 and includes a data type indicator.

A fourth storage command labeled STORE CMD4, specifies data, data duration, data type, and set information. The use of each field listed in the fourth storage command has been described herein.

A listed flush command labeled FLUSH CMD1 flushes any data stored in a graphics processor having a specific data duration indicator value. For example, flushing can include identifying specific data as no longer needed, thereby allowing the data to be overwritten. Once data is flushed, it is available for other garbage collection operations.

Figure 8:
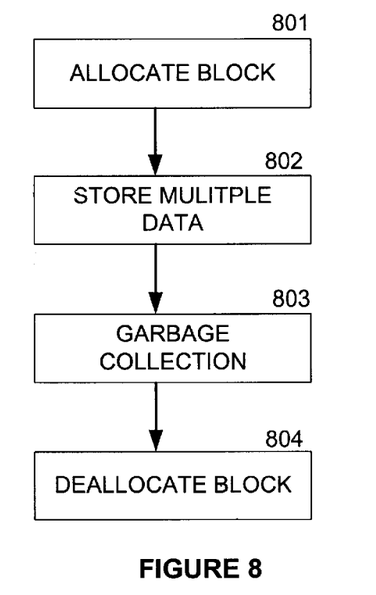
FIG. 8 illustrates, in flow diagram form, a method for handling data in accordance with the present invention.

Another listed flush command, labeled FLUSH CMD2 flushes any data stored in a graphics processor associated with a specific set. For example, flushing can include any data stored in a graphics processor associated with a specific set. For example, FIG. 8 illustrates a method of memory management in accordance with the present invention. At step 801, an entire block of data is allocated. For example, referring to FIG. 1, the block of data 131 for storing persistent data can be allocated at step 801. The amount of data allocated in the method of FIG. 8 will generally be large enough to accommodate the expected amount of persistent data. In addition, a data block can be allocated for the transitory data block 132.

At step 802, multiple objects or textures of data are stored in their respective allocated data blocks. At step 803, a garbage collection process is performed. Garbage collection can be performed on specific blocks of data, and can include any of the garbage collection methods known in the industry. For example, data to be used can be moved to form contiguous blocks of used and unused data within an allocated block.

At step 804, a deallocation command causes the block of data to be deallocated.

Figure 9:
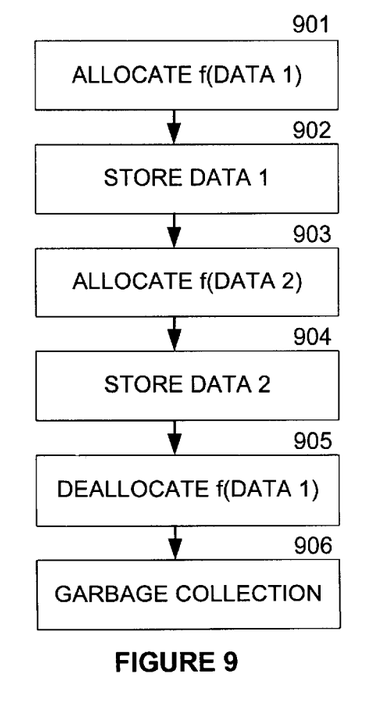
FIG. 9 illustrates, in flow diagram form, another method for handling data in accordance with the present invention.

FIG. 9 illustrates a method of memory management in accordance with the present invention. At step 901, a specific memory location is allocated after the DATA1 store request is received, and is based upon the amount of data identified. For example, step 901 will request allocation of 64 bytes of data in the persistent texture memory area(s) in response to the application providing 64 bytes of texture data to be stored. At step 902, the data is actually stored once the memory has been allocated.

Steps 903 and 904 repeat the functions of steps 901 and 902 for a second data labeled data 2.

Step 905 performs a deallocation of data based upon the specific data no longer needed. This can be accomplished either by specifying a memory location, or an identifier associated with the data. In a specific embodiment, the control portion 112 maintains a list of data identifiers that includes location information of specific data.

Step 906 performs garbage collection on the memory arrays.

It should now be apparent that a method and system for partitioning memory as described herein provides advantages over previous methods and systems. For example, by specifying data as a transient data, it is only sent one time in a multiprocessor system. In addition, other memory overhead functions are simplified, such as allocation, deallocation and garbage collection functions. It should further be appreciated that the present invention has been described in terms of specific embodiments, and that variations to the embodiments espoused herein are anticipated. For example, other types of data, or additional definitions for data duration types can be implemented.

I claim:

1. A method of storing graphics data using a rendering engine of a graphics processor, the method comprising the steps of:
   receiving a command at a control portion of the graphics processor, the command including a graphics data portion and a graphics data duration portion;
   storing data associated with the graphics data portion at a first memory location when the graphics data duration portion indicates a first duration value; and
   storing data associated with the graphics data portion at a second memory location when the graphics data duration portion indicates a second duration value.

2. The method of claim 1, wherein the step of storing data associated with the graphics data portion at the first memory location further includes:
   storing data associated with the graphics data portion at the first memory location when the first duration value indicates the data is expected to be used in rendering fewer than a first predetermined number of frames.

3. The method of claim 2, wherein the step of storing data associated with the graphics data portion at the first memory location further includes:
   storing data associated with the graphics data portion at the first memory when the first predetermined number of frames is 2.

4. The method of claim 2, wherein the step of storing data associated with the graphics data portion at the second memory location further includes:
   storing data associated with the graphics data portion at the second memory location when the second duration value indicates the data is expected to be used in rendering more than a second predetermined number of frames.

5. The method of claim 1, wherein the step of storing data associated with the graphics data portion at the second memory location further includes:
   storing data associated with the graphics data portion at the second memory location when the second duration value indicates the data is expected to be used to rendering at least a predetermined number of frames.

6. The method of claim 1, wherein the step of receiving further includes receiving the command at the control portion of the graphics processor, the command including the graphics data portion, wherein the graphics data portion is texture data.

7. The method of claim 1 wherein the step of receiving further includes:
   receiving the command at the control portion of the graphics processor, the command including the graphics data portion, wherein data associated with the graphics data portion is object data.

8. The method of claim 1, wherein
   the step of receiving further includes:
   receiving the command wherein the command further includes a graphics data type portion;
   the step of storing data associated with the graphics data portion at the first memory location further includes:
   storing data associated with the graphics data portion at the first memory location when the graphics data duration portion indicates the first duration value and the graphics data type portion indicates a first data type value;
   the step of storing data associated with the graphics data portion at the second memory location further includes:
   storing data associated with the graphics data portion at the second memory location when the graphics data duration portion indicates the second duration value and the graphics data type portion indicates the first data type value; and
   the method further includes the steps of:
   storing data associated with the graphics data portion at a third memory location when the graphics data duration portion indicates the first duration value and the graphics data type portion indicates a second data type value;
   storing data associated with the graphics data portion at a fourth memory location when the graphics data duration portion indicates the second duration value and the graphics data type portion indicates the second data type value.

9. The method of claim 8, wherein the step of receiving further includes receiving the command at the control portion of the graphics processor, the command including the graphics data type portion, wherein the first data type indicates texture data and the second data type value indicates object data.

10. The method of claim 1, wherein
the step of storing data associated with the graphics data portion at the first memory location further includes storing data associated with the first memory location, wherein
the first memory location is in a range of X1 to Y1,
data is stored sequentially in the first memory from X1 to Y1, and
Y1 has a value closer to Z than X1; where
X1, Y1 and Z represent physical memory addresses,
the step of storing data associated with the graphics data portion at the second memory location further includes storing data associated with the second memory location, wherein
the second memory location is in a range of X2 to Y2,
the data is stored sequentially in the second memory from m2 to Y2, and
Y2 has a value closer to Z than X2; where
X2, and Y2 represent physical memory addresses.

11. The method of claim 1, wherein
the step of storing data associated with the graphics data portion at the first memory further includes the first duration value for indicating the graphics data portion is associated with a current frame;
the step of storing data associated with the graphics data portion at the second memory further includes the second duration value for indicating the graphics data portion is associated with multiple frames; and
the method further includes the step of
storing data associated with the graphics data portion at a third memory location when the graphics data duration portion indicates a third duration value, where the third duration value indicates the graphics data duration portion is associated with a future frame.

12. The method of claim 11, wherein the step of storing data associated with the graphics data portion at the third memory further includes
storing data associated with the graphics data portion at the third memory where data associated with the fixture frame is based on a next scene.

13. The method of claim 11, wherein the step of storing data associated with the graphics data portion at the third memory further includes:
storing data associated with the graphics data portion at the third memory where data associated with the future frame is based on a next predicted scene.

14. The method of claim 1 further comprising the step of flushing the fist memory independent of flushing the second memory.

15. The method of claim 1, further including the step of:
allocating the first memory portion based upon the graphics data portion.

16. The method of claim 1, further including the step of:
allocating the second memory portion based upon the graphics data portion.

17. The method of claim 1, where in the step of receiving further includes:
receiving a plurality of commands at the control portion of the graphics processor, each of the plurality of commands having its own graphics data portion and graphics data duration portion, wherein the graphics data portion includes a set indicator; and the method further includes the step of
deallocating portions of the first memory based upon the set indicator.

18. The method of claim 17, wherein the step of deallocating includes:
deallocating portion of the second memory based upon the set indicator.

19. The method of claim 18, wherein the step of receiving further includes:
receiving the command, wherein the graphics data duration portion indicates a persistence of the graphics data duration.

20. The method of claim 19, wherein the step of receiving further includes persistence being an indication of a number of frames during which the graphics data duration portion is likely to be used.

21. The method of claim 19, wherein the step of receiving further includes persistence being an indication of a time during which the data associated with the graphics data duration portion is likely to be used.

22. The method of claim 1 wherein
the step of storing data associated with the graphics data portion at the first memory location includes storing data associated with the graphics data portion at the first fame buffer; and
the step of storing data associated with the graphics data portion at the second memory location includes storing data associated with the graphics data portion at the second frame buffer.

23. A method of storing graphics data in a multiple graphics processor system, the method comprising the steps of:
receiving a command at a control portion of the graphics processor, the command including a graphics data portion and a graphics data duration portion;
storing data associated with the graphics data portion at a first memory location associated with a first graphics processor when the graphics data duration portion indicates a first duration value; and
storing data associated with the graphics data portion at a second memory location associated with a second graphics processor when the graphics data duration portion indicates a second duration value.

24. The method of claim 23, wherein the step of storing data associated with the graphics data portion at a second memory further includes:
storing data associated with the graphics data portion at a third memory location of the first graphics processor.

25. The method of claim 24, wherein the step of storing data associated with the graphics data portion at a first memory location further includes:
storing data associated with the graphics data portion at a third memory location and not
storing the graphics data portion in a memory location associated with the second graphics processor.

26. A method of storing graphics data using a graphics processor, the method comprising the steps of:
receiving a plurality of commands at a control portion of the graphics processor, wherein each of the plurality of commands includes a graphics data portion, a graphics data duration portion, and a set indicator;
for each of the plurality of commands, storing data associated with the graphics data portion in a first memory location when the graphics data duration portion indicates a first duration value; and for each of the plurality of commands, storing data associated with the graphics data portion in a second memory location when the graphics data duration portion indicates a second duration value.

27. The method of claim 26, further comprising the step of:

deallocating at least a portion of data stored at the first memory location based upon a first value of the set indicator, wherein the at least a portion of data stored at the first memory locations includes data associated with commands having a first common set indicator.

28. The method of claim 26, further comprising the step of:

deallocating at least a portion of data stored at the second memory location based upon the first value of the set indicator, wherein the at least a portion of data stored at the second memory locations includes data associated with commands having a second common set indicator value.

29. A method of storing graphics data using a graphics processor, the method comprising the steps of:

receiving a first command and a second command of a plurality of commands at a control portion of the graphics processor, wherein each the plurality of commands includes a graphics data portion, a graphics data duration portion;

storing data associated with the first command closer to a memory location Y than data associated with the second command, wherein the first command has a graphics data duration portion indicating a longer persistence than does the second command.

30. A method of storing graphics data using a graphics processor, the method comprising the steps of:

receiving a plurality of commands at a control portion of the graphics processor, wherein each of the plurality of commands includes a graphics data portion, and a graphics data duration portion;

storing data associated with the plurality of commands in a memory based upon a value of the graphics data duration portion;

performing garbage collection on the memory.

31. The method of claim 30 further comprising the step of:

identifying data associated with a specific command of the plurality of commands for garbage collection; and the step of performing further includes performing garbage collection on identified data.

32. The method of claim 30 further comprising the step of:

identifying data associated with a set of command of the plurality of commands for garbage collection;

and the step of performing includes:

performing garbage collection on identified data.

33. A system for storing graphics data, comprising:

a control portion having an input to receive a command;

a first memory location having an input node coupled to the control portion for storing data when a graphics data duration portion of the command indicates a first duration value; and a second memory location having an input node coupled to the control portion for storing data when a graphics data duration portion of the command indicates a second duration value.

34. The system for storing graphics data of claim 33 including:

a first frame buffer including the first memory location; and a second &me buffer including the second memory location.

35. A method of storing graphics data using a rendering engine of a graphics processor, the method comprising the steps of;

receiving a first command and a second command of a plurality of commands at a control portion of the graphics processor, wherein each of the a plurality of commands includes a graphics data portion and a graphics data duration portion;

storing data associated with the first command at a first memory location when the corresponding graphics data duration portion indicates a first duration value; and storing data associated with the second command at a second memory location when the corresponding graphics data duration portion indicates a second duration value, wherein the graphics data portion corresponding to the first command indicates a longer persistence than the graphics data portion corresponding to the second command.

36. The method of claim 35 wherein:

the first duration value indicates the data associated with the first command is expected to be used in rendering fewer than a first predetermined number of frames, and the second duration value indicates the data associated with the second command is expected to be used in rendering more than a second predetermined number of frames.

37. The method of claim 35 wherein:

the first duration value corresponds with transient data associated with the first command and is expected to be used in rendering a next frame, and the second duration value corresponds with persistent data associated with the second command and is expected to be used in rendering beyond the next frame.

* * * * *